United States Patent [19]

Harris et al.

[11] Patent Number: 5,068,306

[45] Date of Patent: Nov. 26, 1991

[54] PROCESS FOR THE PREPARATION OF O-AMINOPHENYL DERIVATIVES OF AMINATED POLY(ALKYLENE GLYCOLS) AND BACKBONE-MODIFIED DERIVATIVES THEREOF

[75] Inventors: Robert F. Harris; Michael D. Joseph, both of Midland, Mich.

[73] Assignee: The Dow Chemical Company, Midland, Mich.

[21] Appl. No.: 605,591

[22] Filed: Oct. 30, 1990

[51] Int. Cl.$^5$ .............................................. C08G 18/32
[52] U.S. Cl. ........................................ 528/68; 528/64; 528/76; 528/78; 564/38; 564/50; 564/52; 564/163
[58] Field of Search ...................... 528/68, 64, 76, 78; 564/38, 50, 52, 163

[56] References Cited

U.S. PATENT DOCUMENTS

| | | | |
|---|---|---|---|
| 3,808,250 | 4/1974 | Blahak et al. | 260/544 |
| 4,177,041 | 12/1979 | Sung et al. | 44/71 |
| 4,180,644 | 12/1979 | Marquis et al. | 528/68 |
| 4,191,706 | 3/1980 | Marquis et al. | 544/94 |
| 4,194,070 | 3/1980 | Marquis et al. | 521/163 |
| 4,239,700 | 12/1980 | Marquis et al. | 564/157 |
| 4,504,278 | 3/1985 | Sung | 44/53 |
| 4,609,683 | 9/1986 | Grigsby, Jr. et al. | 521/159 |
| 4,609,684 | 9/1986 | Grigsby, Jr. et al. | 521/163 |

OTHER PUBLICATIONS

Clark et al., "Isatoic Anhydride. I. Reactions with Primary and Secondary Amines and with Some Amides," 9 J. Org. Chem., 55 (1944).

Staiger et al., "Isatoic Anhydride. IV. Reactions with Various Nucleophiles," vol. 24, pp. 1214–1219 (Sep. 1959).

Staiger et al., "Isatoic Anhydride. III. Reactions with Primary and Secondary Amines," 18 *J. Org. Chem.*, 1427 (1953).

*Primary Examiner*—Maurice J. Welsh
*Attorney, Agent, or Firm*—Ann K. Galbraith

[57] ABSTRACT

Disclosed herein is a process for the preparation of an o-aminophenyl derivative of a polyalkyleneoxy polyamine which comprises adding a polyalkyleneoxy polyamine to a dispersion or solution of an isatoic anhydride under reaction conditions sufficient to form the corresponding o-aminophenyl derivative. Also disclosed is an o-aminophenyl derivative of a modified polyamine comprising a backbone portion containing at least one polyalkyleneoxy moiety and one or more internal urea, biuret, amide, thiourea, dithiobiuret, or thioamide moieties, and a plurality of o-aminophenyl end groups wherein each o-aminophenyl group is separated from each urea, biuret, amide, thiourea, dithiobiuret, or thioamide moiety by at least one alkylene, cycloalkylene, aralkylene, arylene, or alkyleneoxy moiety with 4–20 carbon atoms, or at least one polyalkyleneoxy moiety containing from 2–50 alkyleneoxy units; as well as prepolymers and polymers prepared therefrom.

34 Claims, No Drawings

1

PROCESS FOR THE PREPARATION OF O-AMINOPHENYL DERIVATIVES OF AMINATED POLY(ALKYLENE GLYCOLS) AND BACKBONE-MODIFIED DERIVATIVES THEREOF

BACKGROUND OF THE INVENTION

This invention relates to processes for reacting amines with isatoic anhydrides and, more specifically, to processes for reacting aminated poly(alkylene glycols) with isatoic anhydrides to make o-aminophenyl derivatives of such poly(alkylene glycols).

Processes for reacting aminated poly(alkylene glycols) with isatoic anhydrides to make o-aminophenyl derivatives of such poly(alkylene glycols) are known and are described, for example, in U.S. Pat. Nos. 4,180,644: 4,191,706: 4,609,683: and 4,609,684. Such derivatives are useful in the preparation of urethane and/or urea polymers as additives to modify the physical properties of the urethane, such as tensile strength, elongation, tear strength, flexibility, and hardness. Such additives are also useful to control the reactivity of the reaction mixture. Since urethane and/or urea polymers are typically prepared by reacting active hydrogen-containing compounds with polyisocyanates, introducing active hydrogen-containing compounds into the reaction mixture which have varying degrees of reactivity advantageously allows one to control the speed of the reaction of the components.

In the processes described in the above-mentioned patents, the process comprises reacting aminated poly(alkylene glycols) with isatoic anhydrides. However, the reaction product of such processes does not react completely with polyisocyanates to form urethanes and/or ureas. Such prior art processes may lead to the formation of a substantial amount of a side product comprising a corresponding urea carboxylate, which does not react with polyisocyanates. Other processes use large stoichiometric amounts of polyamine to achieve a higher conversion rate and higher yield. These processes result in a large amount of excess polyamine in the reaction mixture, which must be separated from the desired product. A process for the preparation of o-aminophenyl derivatives of aminated poly(alkylene glycols) which does not produce substantial amounts of urea carboxylate, nor require large amounts of polyamine to be separated from the reaction product, is desired.

SUMMARY OF THE INVENTION

In one aspect, this invention is a process for the preparation of an o-aminophenyl derivative of a polyalkyleneoxy polyamine which comprises adding a polyalkyleneoxy polyamine to a dispersion or solution of an isatoic anhydride under reaction conditions sufficient to form the corresponding o-aminophenyl derivative.

It has been discovered that the processes of the invention provides a high-yield process for preparing o-aminophenyl derivatives of aminated poly(alkylene glycols) without the formation of the corresponding urea carboxylate in substantial amounts.

In a second aspect, this invention is an o-aminophenyl derivative of a modified polyamine comprising a backbone portion containing at least one polyalkyleneoxy moiety and one or more internal urea, biuret, amide, thiourea, dithiobiuret, or thioamide moieties, and a plurality of o-aminophenyl end groups wherein each o-aminophenyl group is separated from each urea, biuret, amide, thiourea, dithiobiuret, or thioamide moiety by at least one alkylene, cycloalkylene, aralkylene, arylene, or alkyleneoxy moiety with 4–20 carbon atoms, or at least one polyalkyleneoxy moiety containing from 2–50 alkyleneoxy units: as well as prepolymers and polymers prepared therefrom. Polymers prepared from these backbone-modified o-aminophenyl derivatives have desirable properties such as increased modulus and tensile strength, and a relatively low coefficient of linear thermal expansion.

DETAILED DESCRIPTION OF THE INVENTION

Polyalkyleneoxy polyamines suitable for use in the process of the present invention include any polyamine with polyalkyleneoxy groups in its backbone. Such polyamines are well-known compositions which may be prepared by a variety of methods. These polyalkyleneoxy polyamines preferably have equivalent weights, per primary or secondary amine group, of at least about 55, more preferably at least about 100, and most preferably at least about 150 and preferably no greater than about 10,000, more preferably no greater than about 5,000, and most preferably no greater than about 3,000. The average amine functionality of such polyalkyleneoxy polyamines is preferably at least about 1.0, more preferably at least about 1.5, and most preferably at least about 2.0: and is preferably no greater than about 8.0, more preferably no greater than about 4.0, and most preferably no greater than about 3 0. Preferably, the polyalkyleneoxy polyamines are diamines or triamines.

Polyalkyleneoxy polyamines are conventionally prepared by the reductive amination of polyether polyols using hydrogen and ammonia in the presence of catalyst. This reductive amination of polyols is described in U.S. Pat. Nos. 3,128,311: 3,152,998: 3,236,895: 3,347,926 3,654,370: 4,014,933 and 4,153,581, which are hereby incorporated by reference in their entirety. Additional methods for the preparation of such polyamines are described, for example, in U.S. Pat. No. 4,180,644, Column 3, line 39 to Column 5, line 12, which is hereby incorporated by reference.

Polyether polyols suitable for use in the preparation of the polyalkyleneoxy polyamines may be prepared by any known method and include, for example, polyoxyethylene and polyoxypropylene diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945: 4,218,543: and 4,374,210, which are hereby incorporated by reference in their entirety.

Polypropyleneoxy diamines suitable for use in the process of the invention are preferably of the following formula:

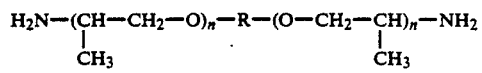

wherein R is the residue of a bifunctional active hydrogen-containing compound, such as an alkylene, alkyleneoxy, polyalkyleneoxy, cycloalkylene, aralkylene, or aryl group with 1-20 carbon atoms, and n is separately in each occurrence a whole number from 1 to 50.

Polypropyleneoxy triamines suitable for use in the process of the invention are preferably of the following formula:

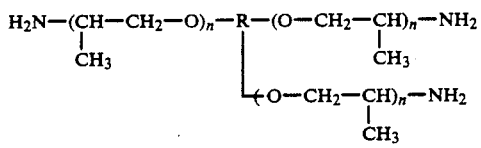

wherein R is the residue of a trifunctional active hydrogen-containing compound as defined above, and n is as defined above.

In addition, polyalkyleneoxy polyamines which contain at least one polyalkyleneoxy moiety and one or more internal urea, biuret, amide, thiourea, dithiobiuret, or thioamide moieties, and a plurality of o-aminophenyl end groups wherein each o-aminophenyl group is separated from each urea, biuret, amide, thiourea, dithiobiuret, or thioamide moiety by at least one alkylene, cycloalkylene, aralkylene, arylene, or alkyleneoxy moiety with 4-20 carbon atoms, or at least one polyalkyleneoxy moiety containing from 2-50 alkyleneoxy units, the preparation of which is described hereinafter, are also suitable for use in the process of the invention.

Isatoic anhydrides suitable for use in the process of the invention include any isatoic anhydride which is unsubstituted or substituted with any group which is inert to a reaction with an amine. Examples of such anhydrides include those of the following formula:

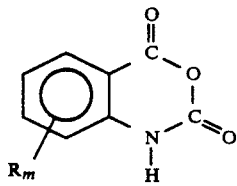

wherein m is a number between 1 and 4, and R is selected from the group consisting of hydrogen, alkyl, nitro, halo, hydroxy, and cyano. Most preferably, R is hydrogen.

To carry out the process of the present invention, the isatoic anhydride is first dissolved or dispersed in a solvent or inert fluid. Suitable solvents and inert fluids include, for example, toluene, acetone, methylethylketone, benzene, xylene, cumene, hexane, active hydrogen-containing compounds, and o-aminophenyl derivatives of polyalkyleneoxy polyamines. Preferably, the solvent or inert fluid is toluene, acetone, methylethylketone, or an o-aminophenyl derivative of a polyalkyleneoxy polyamine. Most preferably, the solvent or inert fluid is an o-aminophenyl derivative of a polyalkyleneoxy polyamine, since this method conveniently allows for the use of the reaction product (the o-aminophenyl derivative of the polyalkyleneoxy polyamine) as the inert fluid. In such an embodiment, the process of the invention is begun with the use of another solvent or inert fluid as described above. After the initial batch of the polyamine and the dissolved or dispersed isatoic anhydride has been reacted, the solvent or inert fluid may be removed from the reaction product, and more isatoic anhydride may be dispersed therein to form a dispersion of isatoic anhydride, which may then be reacted with additional polyalkyleneoxy polyamines.

Other than the o-aminophenyl derivative of the polyalkyleneoxy polyamine, the most preferred solvents or inert fluids for use in the process of the invention are those which boil at relatively low temperatures, so that they may be easily distilled from the reaction product, and which are inert to a reaction with an amine or a carbonyl group, such as toluene. The term "inert fluid" as used above means that the fluid does not substantially interfere with the process for making an o-aminophenyl derivative of a polyalkyleneoxy polyamine, although it may react slightly with the amine or isatoic anhydride. For example, acetone has a carbonyl group which may react slightly with the amine however, acetone is still suitable for use in the process of this invention as a fluid in which to disperse the isatoic anhydride.

In another preferred embodiment, the inert fluid is an active hydrogen-containing compound, wherein the active hydrogen groups of the compound are less reactive towards isatoic anhydrides than the polyalkyleneoxy polyamine used in the process of the invention. As used herein, "active hydrogen" moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such active hydrogen moieties are —COOH, —OH, —NH—, —CONH$_2$, —SH, and —CONH—. Suitable active hydrogen-containing compounds include polyols, less-reactive polyamines, polyamides, polymercaptans and polyacids. Preferred active hydrogen-containing compounds are polyols, since these compounds are typically used in the preparation of polyurethanes. In such an embodiment, the isatoic anhydride may be dispersed in the polyol, to which is added the polyalkyleneoxy polyamine. Advantageously, the isatoic anhydride will react preferentially with the polyalkyleneoxy polyamine, resulting in a dispersion of the desired product in a polyol, which may than be reacted with a polyisocyanate in the preparation of a polyurethane.

As mentioned above, to carry out the process of the invention, the isatoic anhydride is preferably first dispersed or dissolved in a solvent or inert fluid. The weight percent of the isatoic anhydride relative to solvent or inert fluid is preferably at least about 1 percent, more preferably at least about 5 percent, and most preferably at least about 10 percent and is preferably no greater than about 50 percent, more preferably no greater than about 35 percent, and most preferably no greater than about 25 percent. The dispersion or solution of isatoic anhydride is then contacted with a polyalkyleneoxy polyamine under reaction conditions sufficient to form the corresponding o-aminophenyl derivative. Preferably, the equivalent ratio of isatoic anhydride:polyalkyleneoxy polyamine is at least about 0.3 1, more preferably at least about 0.9:1; and is preferably no greater than about 2:1, more preferably no greater than about 1.1:1. Most preferably, the equivalent ratio is about 1 1. In general, the reaction proceeds as follows:

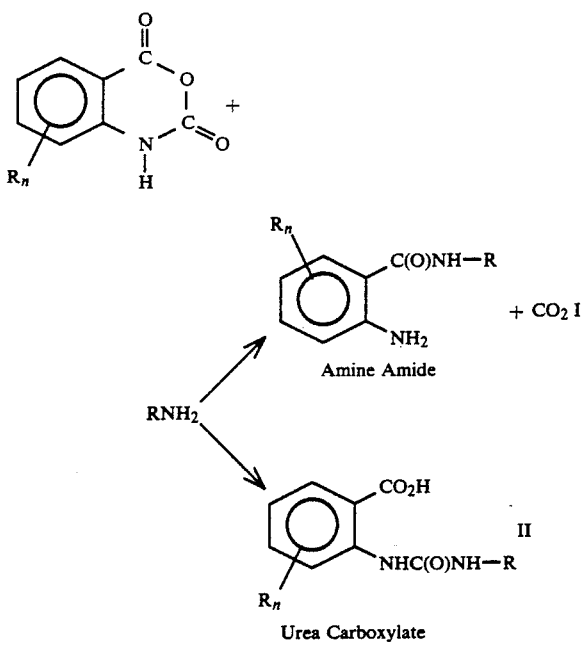

The above diagram shows two products of reaction between an amine and an isatoic anhydride: an amine amide (I) and a urea carboxylate (II). In the process of the invention, the polyamine is added to the dispersion or solution of isatoic anhydride under conditions such that the formation of a urea carboxylate is minimized or eliminated.

Preferably, the reaction of the isatoic anhydride and polyalkyleneoxy polyamine is carried out by adding the polyalkyleneoxy polyamine slowly to the dispersion or solution of isatoic anhydride. The polyamine is added slowly in order to minimize the local concentration of polyamine in the reaction mixture, since higher local concentrations of polyamine in the reaction mixture will lead to higher concentrations of urea carboxylate in the reaction product. The rate of addition of the polyamine to the reaction mixture will vary with the temperature and concentration of the solution or dispersion of isatoic anhydride. The addition rate is adjusted to add the polyamine as quickly as it can react with the isatoic anhydride. If the polyamine is added too quickly, its concentration may build up and produce basic conditions in the reaction mixture leading to urea carboxylate formation. The polyamine addition rate can be increased if the reaction temperature is increased, since the reaction rate between the polyamine and the isatoic anhydride increases with increasing reaction temperature. Preferably, the polyalkyleneoxy polyamine is added over a period of at least about one hour. In addition, the polyalkyleneoxy polyamine is also preferably added under conditions of agitation, since this may serve to lower local concentrations of the polyalkyleneoxy polyamine in the reaction mixture. The selectivity of the reaction to the formation of the o-aminophenyl derivative over the urea carboxylate derivative is preferably at least about 90 percent, more preferably at least about 95 percent, and most preferably at least about 98 percent.

The process of the invention may be carried out at any temperature at which the reaction between the isatoic anhydride and polyalkyleneoxy polyamine will proceed, but is preferably at least about 0° C., more preferably at least about 25° C., and most preferably at least about 35° C.: and is preferably no greater than about the boiling point of the inert fluid, more preferably no greater than about 150° C., and most preferably no greater than about 100° C.

After the polyamine is added to the solution or dispersion of isatoic anhydride, the reaction mixture is preferably heated for a period of time to insure complete reaction between the polyamine and cyclic anhydride. Preferably, the reaction mixture is heated for less than 2 hours at 25° C. to 100° C.

The o-aminophenyl derivative of the polyalkyleneoxy polyamine prepared by the process of the invention is useful in the preparation of polyurethane foams and elastomers as an active hydrogen-containing material. As mentioned above, such products have been discovered to be useful in the preparation of polyurethane polymers as additives to modify the physical properties of the polymer, such as tensile strength, elongation, tear strength, flexibility, and hardness. Such products are also useful to control the reactivity of the reaction mixture, since the o-aminophenyl derivative will react at a slower rate than the primary amine starting material.

Polyurethane elastomers may be prepared by, for example, reaction injection molding or hand cast processes wherein an isocyanate is reacted with an active hydrogen-containing composition. Preferably, the polyurethane elastomer is prepared by a one-shot reaction injection molding (RIM) process. Such processes are well-known in the art and are described, for example, in Sweeney. F. Melvin, *Reaction Injection Molding Machinery and Processes,* Marcel Dekker, Inc., (1987), which is hereby incorporated by reference. The use of reaction injection molding (RIM) polyurethanes in the production of structural parts for automotive applications such as fenders, doors and body panels as well as in other applications such as computer housings, sports equipment and the like is well-known. Polyurethane foams are typically prepared by well-known molding or slabstock techniques by a process which comprises the mixing of an isocyanate and an active hydrogen-containing composition in the presence of a blowing agent as illustrated, for example, in U.S. Pat. No. 4,845,133, which is hereby incorporated by reference in its entirety. The use of such foams in furniture, bedding, carpeting, packaging, and automotive applications is well-known.

In a second aspect, this invention is a backbone-modified polyamine containing o-aminophenyl end groups, as well as prepolymers and polymers thereof. These backbone-modified o-aminophenyl derivatives have desirable properties such as increased modulus and tensile strength, and a relatively low coefficient of linear thermal expansion. These backbone-modified polyamines with o-aminophenyl end groups may be prepared by contacting a polyalkyleneoxy polyamine with a dispersion or solution of an isatoic anhydride under reaction conditions sufficient to form the corresponding o-aminophenyl derivative, wherein the polyalkyleneoxy polyamine contains one or more internal urea, amide, biuret, thiourea, dithiobiuret, or thioamide moieties. Polyalkyleneoxy polyamines containing one or more internal urea, amide, biuret, thiourea, dithiobiuret, or thioamide moieties per molecule and methods for their preparation are described in U.S. Pat. No. 4,916,201, and copending applications U.S. Ser. Nos.

254,503, filed Oct. 6, 1999, and 485,678, filed Feb. 27, 1990, both by Robert F. Harris, which are hereby incorporated by reference in their entirety.

Prepolymers of these o-aminophenyl derivatives may be prepared by reacting the o-aminophenyl derivative with excess polyisocyanate. Suitable polyisocyanates and methods for the preparation of such prepolymers are described in the above-mentioned patent and copending patent applications. Polymers of these prepolymers may be prepared by reacting these prepolymers with an active hydrogen-containing compound or mixtures of active hydrogen-containing compounds, optionally in the presence of additional polyisocyanates. In addition, polymers of the o-aminophenyl derivatives may be prepared by reacting an o-aminophenyl derivative with a polyisocyanate, optionally in the presence of additional active hydrogen-containing compounds. Suitable active hydrogen-containing compounds useful in the preparation of these polymers, as well as methods for their preparation, are also described in the above-mentioned patent and copending patent applications.

ILLUSTRATIVE EMBODIMENTS

The following examples are given to illustrate the invention and should not be interpreted as limiting it in any way. Unless stated otherwise, all parts and percentages are given by weight.

EXAMPLE 1

Reaction of an Aminated Poly(propylene Glycol) with Isatoic Anhydride by the Dropwise Addition of an aminated poly(propylene glycol) to an Isatoic Anhydride Slurry in Toluene at 60° C.

Isatoic anhydride (32.60 g, 0.200 mol) is placed in a 500 ml reactor, and maintained under a nitrogen atmosphere, and is slurried in toluene (77.3 g). An aminated poly(propylene glycol) of 2031 molecular weight (Jeffamine ™ D-2000, Texaco) (203.1 g, 0.100 mol) is added to the dropping funnel. The reactor is heated to 60° C. and the D-2000 is added dropwise over a period of 90 minutes. After addition, the reactor is heated at 60° C. for 1 hour, then the toluene is removed by heating under reduced pressure, finishing at 125° C. for 2 hours at 1 mm Hg pressure. After heating at 150° C. for 3 additional hours, the product (227.6 g) is obtained as a dark red liquid: 0.0379 meq/g aliphatic amine by HCl titration, which corresponds to a 95.7 percent aliphatic amine conversion: 0.874 meq/g total amine by HClO$_4$ titration, which corresponds to 95.1 mol percent amine amide: 100:0 molar ratio of amine amide:urea carboxylate by proton NMR analysis: carbon-13 NM shows only the amine amide carbonyl (168.7 ppm amide). The urea carboxylate is not detected by proton or carbon-13 NMR.

| Assay: | 94.9 wt % | Amine Amide |
|---|---|---|
| | 0 wt % | Urea Carboxylate |
| | 3.8 wt % | D-2000 |
| | 98.7 wt % | Total |

EXAMPLES 2-8

Poly(propylene Glycol) with Isatoic Anhydride by the Dropwise Addition of an Aminated Poly(propylene Glycol) to an Isatoic Anhydride Slurry. Effects of Dispersing Media and Temperature Using a similar procedure to that used in EXAMPLE 1, a series of additional experiments are carried using different fluids, temperatures and 5 percent excess isatoic anhydride in some cases. The results are summarized in Table I. The amine amide:urea carboxylate molar ratio is >98:2 in all cases. In most cases urea carboxylate can not be detected. These results illustrate the very high selectivity to amine amide by using the process of this invention.

COMPARATIVE EXAMPLE 1

Reaction of an Aminated Poly(propylene Glycol) with Isatoic Anhydride Using Process of Texaco Patents. Batchwise Addition of Isatoic Anhydride to an Aminated Poly(propylene Glycol)

An aminated poly(propylene glycol) of 2031 molecular weight (Jeffamine ™ D-2000, Texaco) (203.1 g, 0.100 mol, an aminated poly(propylene glycol) in a 500 ml, reactor and maintained under a nitrogen atmosphere. The reactor is heated to 30° C. and isatoic anhydride (32.60 g, 0.200 mol) is added in small batches through the stoppered port over a 15 minute period. The reaction temperature exotherms to 40° C. during the addition and CO$_2$ is evolved. After the addition is complete, the reactor is heated at 40° C. for 2 hours, then at 50° C. for 16 hours and 100° C. for 5 additional hours. The product (226.0 g) was obtained as a dark red liquid: 0.0541 meq/g aliphatic amine by HCl titration, which corresponds to a 93.9 percent aliphatic amine conversion: 0.770 meq/g total amine by HClO$_4$ titration, which corresponds to 80.9 mol percent amine amide: 86.8:13.2 molar ratio of amine amide:urea carboxylate by proton NMR analysis: carbon-13 NMR shows both the amine amide carbonyl (168.7 ppm, amide) and the urea carboxylate carbonyls (154.8 ppm, urea, and 170.2 ppm, carboxylate). The composition does not change substantially after heating at 150° C. for an additional 3 hours.

| Assay: | 81.2 wt % | Amine Amide |
|---|---|---|
| | 12.8 wt % | Urea Carboxylate |
| | 5.5 wt % | D-2000 |
| | 99.5 wt % | Total |

COMPARATIVE EXAMPLE 2

Reaction of an Aminated Poly(propylene Glycol) with Isatoic Anhydride by the Rapid Addition of an Aminated Poly(propylene Glycol) to Neat Isatoic Anhydride Isatoic anhydride (32.60 g, 0.200 mol) is placed in the same reactor used in Example 1 except containing a 250 ml addition funnel. An aminated poly(poly(propylene glycol) (Jeffamine ™ D-2000) (203.1 g, 0.100 mol) is placed in the addition funnel. The reactor was heated to 40° C. and the D-2000 1s added quickly over a 5 minute period with rapid stirring. After the addition, the reactor is heated at 40° C. for 1 hour, then at 50° C. for 1 hour and at 90° C. for 5 hours. The product (227.4 g) is obtained as a dark red liquid: 0.0368 meq/g aliphatic amine by HCl titration, which corresponds to a 95.9 percent aliphatic amine conversion: 0.750 meq/g total amine by HClO$_4$ titration, which corresponds to 81.0 mol percent amine amide: 87.8:12.2 molar ratio of amine amide:urea carboxylate by proton NMR analysis: carbon-13 NMR shows both the amine amide carbonyl (168.7 ppm, amide) and the urea carboxylate carbonyls (154.8 ppm, urea, and 170.2 ppm, carboxylate). The composition does not change substantially (88.8:11.2 molar ratio of amine amide:urea carboxylate) after heating at 150° C. for an additional 3 hours.

| Assay: | 80.9 wt % | Amine Amide |
|---|---|---|
| | 11.7 wt % | Urea Carboxylate |
| | 3.7 wt % | D-2000 |
| | 96.3 wt % | Total |

EXAMPLE 9

Example Reaction of an Aminated Poly(propylene Glycol) with Isatoic Anhydride by the Dropwise Addition of an Aminated Poly(propylene Glycol)to an Isatoic Anhydride Slurry in a Previously Made Product Isatoic anhydride (34.23 g, 0.210 mol) is placed in the same reactor used in Example 1 and is slurried in a portion of the product from Example 1 (75.1 g). An aminated poly(propylene glycol) (Jeffamine ™ D-2000) (203.1 g, 0.100 mol) is placed in the addition funnel. The reactor is heated to 60° C. and the D-2000 is added dropwise After addition, the reactor is heated at 100° C. for 3 hours, then at 150° C. for 3 additional hours. The product (304.3 g) is obtained as a dark red liquid: 0.0290 meq/g aliphatic amine by HCl titration, which corresponds to a 96.7 percent aliphatic amine conversion: 0.877 meq/g total amine by HClO$_4$ titration, which corresponds to 95.2 mol percent amine amide: 100:0 molar ratio of amine amide:urea carboxylate by proton NMR analysis: carbon-13 NMR shows only the amine amide carbonyl (168.7 ppm, amide). The urea carboxylate is not detected by proton or carbon-13 NMR.

| Assay: | 96.2 wt % | Amine Amide |
|---|---|---|
| | 0 wt % | Urea Carboxylate |
| | 2.9 wt % | D-2000 |
| | 99.1 wt % | Total |

This example shows a preferred mode of operation of the process of this invention. A product from a previous reaction is used as the medium for the dispersal of solid isatoic anhydride. The product does not require solvent removal or purification of any kind.

EXAMPLE 10

Reaction of an Aminated Poly(propylene Glycol) with Isatoic Anhydride by the Dropwise Addition of an Aminated Poly(propylene Glycol) to an Isatoic Anhydride Slurry in a Previously Made Product. Reaction Scale Up Isatoic anhydride (97.8 g, 0.600 mol) is placed in the same reactor set up used in Example 1 (except a 2-liter reactor is used) and is slurried in a portion of previously prepared product (250 g). Aminated Poly(propylene Glycol) (Jeffamine ™ D-2000) (609.33 g, 0.300 mol) is placed in the addition funnel. The reactor is heated to 60° C. and the D-2000 is added dropwise over a period of 227 minutes. After addition, the reactor is heated at 150° C. for 3 additional hours. The product (937.5 g) is obtained as a dark red liquid: 0.0410 meq/g aliphatic amine by HCl titration, which corresponds to a 96.2 percent aliphatic amine conversion: 0.885 meq/g total amine by HClO$_4$ titration, which corresponds to 95.2 mol percent amine amide: 100:0 molar ratio of amine amide:urea carboxylate by proton NMR analysis: carbon-13 NMR shows only the amine amide carbonyl

TABLE 1

Summary of Experimental Results

| Experiment | Moles Reactant D-2000 | Moles Reactant IA | Dispersing Fluid | D-2000 Addition Time (min) | Rxn Temp During Addition (°C.) | Additional Heating Schedule | % Amine Conv | mol % Amine Amide | Amine Amide: Urea Carboxylate Molar Ratio |
|---|---|---|---|---|---|---|---|---|---|
| Comp 2 | 0.100 | 0.200 | none | 5 | 40 | 40°/1 hr 50°/1 hr 90°/5 hr 150°/3 hr | 95.4 | 86.3 | 88.8/11.2 |
| 1 | 0.100 | 0.200 | Toluene | 90 | 60 | 60°/1 hr 125°/2 hr/1 mm 150°/3 hr | 95.7 | 95.1 | 100/0 |
| 2 | 0.100 | 0.200 | Toluene | 110 | 100 | 100°/1 hr 100°/2 hr/1 mm 150°/3 hr | 93.6 | 90.8 | 100/0 |
| 3 | 0.100 | 0.200 | Acetone | 75 | 50 | 50°/20 hr 90°/1 hr/1 mm 150°/3 hr | 94.9 | 93.8 | 100/0 |
| 4 | 0.100 | 0.200 | MEK | 73 | 75 | 75°/18 hr 110°/2 hr/1 mm 150°/3 hr | 95.2 | 93.6 | 100/0 |
| 5 | 0.100 | 0.210 | Toluene | 92 | 40 | 100°/3 hr 110°/3 hr/1 mm 150°/3 hr | 96.5 | 93.4 | 98.2/1.8 |
| 6 | 0.100 | 0.210 | Toluene | 120 | 60 | 60°/5 hr 125°/1 hr/1 mm 150°/3 hr | 97.3 | 96.3 | 99.0/1.0 |
| 7 | 0.100 | 0.210 | Toluene | 95 | 80 | 80°/3 hr 110°/2 hr/1 mm 150°/3 hr | 96.8 | 94.4 | 100/0 |
| 8 | 0.100 | 0.210 | Toluene | 82 | 100 | 100°/3 hr 120°/3 hr/1 mm 150°/3 hr | 96.7 | 96.0 | 99.5/0.5 |

(168.7 ppm, amide). The urea carboxylate is not detected by proton or carbon-13 NMR.

| Assay: | 95.7 wt % | Amine Amide |
|---|---|---|
| | 0 wt % | Urea Carboxylate |
| | 4.2 wt % | D-2000 |
| | 99.9 wt % | Total |

EXAMPLE 11

Reaction of an Aminated Poly(propylene with Isatoic Anhydride by the Dropwise Addition of an Aminated Poly(propylene Glycol) to an Isatoic Anhydride Slurry in Toluene at 60° C.

Isatoic anhydride (48.92 g, 0.300 mol) is placed in the same reactor used in Example 1 and is slurried in toluene (69.2 g). An aminated poly(propylene glycol) of about 400 molecular weight manufactured by Texaco (Jeffamine TM D-400) (69.15 g, 0.300 mol), is added to the dropping funnel. The reactor is heated to 60° C. and the D-400 is added dropwise over a period of 120 minutes. After addition the reactor is heated at 100° C. for 3 hours, then the toluene is removed by heating under reduced pressure, finishing at 150° C. for 3 hours at 1 mm Hg pressure. The product (105.1 g) is obtained as a dark red liquid: 0.195 meq/g aliphatic amine by HCl titration, which corresponds to a 93.2 percent aliphatic amine conversion: 2.833 meq/g total amine by HClO4 titration, which corresponds to 92.4 mol percent amine amide: 100 0 molar ratio of amine amide:urea carboxylate by proton NMR analysis; carbon-13 NMR shows only the amine amide carbonyl (168.7 ppm, amide). The urea carboxylate is not detected by proton or carbon-13 NMR.

| Assay: | 92.3 wt % | Amine Amide |
|---|---|---|
| | 0 wt % | Urea Carboxylate |
| | 4.5 wt % | D-400 |
| | 96.8 wt % | Total |

EXAMPLE 12

Reaction of an Aminated Poly(propylene Glycol) with Isatoic Anhydride by the Dropwise Addition of an Aminated Poly(propylene Glycol) to an Isatoic Anhydride Slurry in Toluene at 60° C.

Isatoic anhydride (16.30 g, 0.100 mol) is placed in the same reactor used in Example 1 and is slurried in toluene (75.1 g). Jeffamine TM T-5000 (195.6 g, 0.100 eq amine, a glycerine-initiated propylene oxide based triol of about 5000 molecular weight which has been aminated, manufactured by Texaco) is placed in the addition funnel. The reactor is heated to 60° C. and the D-400 is added dropwise over a period of 133 minutes. After addition, the reactor is heated at 100° C. for 3 hours, then the toluene is removed by heating under reduced pressure, finishing at 150° C. for 3 hours at 1 mm Hg pressure. The product (206.9 g) is obtained as a dark red liquid: 0.0197 meq/g aliphatic amine by HCl titration, which corresponds to a 95.9 percent aliphatic amine conversion; 0.469 meq/g total amine by HClO4 titration, which corresponds to 93.0 mol percent amine amide: 100:0 molar ratio of amine amide:urea carboxylate by proton NMR analysis: carbon-13 NMR shows only the amine amide carbonyl (168.7 ppm, amide). The urea carboxylate is not detected by proton or carbon-13 NMR.

| Assay: | 93.3 wt % | Amine Amide |
|---|---|---|
| | 0 wt % | Urea Carboxylate |
| | 3.9 wt % | T-5000 |
| | 97.2 wt % | Total |

EXAMPLE 13

Reaction of an Aminated Poly(propylene Glycol) with Isatoic Anhydride by the Dropwise Addition of an Aminated Poly(propylene Glycol) to an Isatoic Anhydride Slurry in Toluene at 60° C.

Isatoic anhydride (65.21 g, 0.400 mol) is placed in the same reactor used in Example 1 and is slurried in toluene (150 g). Jeffamine TM T-403 (62.34 g, 0.400 eq amine, a trimethylolpropane initiated propylene oxide based triol of about 440 molecular weight which has been aminated, manufactured by Texaco) is placed in the addition funnel. The reactor is heated to 60° C. and the T-403 is added dropwise over a period of 61 minutes. After addition, the reactor is heated at 100° C. for 3 hours, then the toluene is removed by heating under reduced pressure, finishing at 150° C. for 3 hours at 1 mm Hg pressure. The product (110.1 g) is obtained as a dark red liquid: 0.381 meq/g aliphatic amine by HCl titration, which corresponds to a 89.5 percent aliphatic amine conversion: 0.0582 meq/g total amine by HClO4 titration, which corresponds to 85.5 mol percent amine amide: 95.8:4.3 molar ratio of amine amide:urea carboxylate by proton NMR analysis: carbon-13 NMR shows the amine amide carbonyl (168.7 ppm, amide). The urea carboxylate is detected at low levels by proton and carbon-13 NMR.

| Assay: | 85.5 wt % | Amine Amide |
|---|---|---|
| | 4.4 wt % | Urea Carboxylate |
| | 5.9 wt % | T-403 |
| | 96.1 wt % | Total |

EXAMPLE 14

Reaction of an Aminated Mono(propylene Glycol) with Isatoic Anhydride by the Dropwise Addition of an Aminated Mono(propylene Glycol) to an Isatoic Anhydride Slurry in Toluene at 36° C.

Isatoic anhydride (16.31 g, 0.100 mol) is placed in the same reactor set up used in Example 1 (except the reactor volume is 250 ml) and is slurried in toluene (47 g). Jeffamine TM M-600 (60.3.g, 0.100 mol, a 2-methoxyethanol initiated propylene oxide adduct of about 600 molecular weight which had been aminated, manufactured by Texaco) is place in the addition funnel. The reactor is heated to 36° C. and the M-600 is added dropwise over a period of 150 minutes. After addition, the reactor is heated at 100° C. for 3 hours, then the toluene is removed by heating under reduced pressure, finishing at 110° C. for 1 hour at 1 mm Hg pressure, then at 150° C. for 3 additional hours. The product (70.2 g) is obtained as a dark red liquid: 0.0413 meq/g aliphatic amine by HCl titration, which corresponds to a 97.0 percent aliphatic amine conversion: 1.306 meq/g total amine by HClO4 titration, which corresponds to 91.3 mol percent amine amide: 100:0 molar ratio of amine amide:urea carboxylate by proton NMR analysis: carbon-13 NMR shows only the amine amide carbonyl (168.7 ppm, amide). The urea carboxylate is not detected by proton or carbon-13 NMR.

| Assay: | 91.4 wt % | Amine Amide |
|---|---|---|
| | 0 wt % | Urea Carboxylate |
| | 2.5 wt % | M-600 |
| | 93.9 wt % | Total |

EXAMPLE 15

Preparation of a Diamine Containing a Poly(propyleneoxy) Backbone and Six Amide Moieties Based on Adipic Acid and 0-400 and Containing o-Aminophenyl End Groups A diamine containing a poly(propyleneoxy) backbone and about six amide moieties per average molecule (6-Amide Diamine, MW=2590) was prepared from (1) Jeffamine ™ D-400 (an aminated poly(propylene glycol) of about 400 molecular weight manufactured by Texaco) and (2) adipic acid using the procedure described in U.S. Ser. No. 485,678, filed Feb. 27, 1990, by the same inventor. (1.3:1 molar ratio of D-400:adipic acid). Isatoic anhydride (32.61 g, 0.200 mol) is slurried with toluene (75 g) in a 500 ml, 3-necked reactor equipped with a stirrer, thermometer, condenser, dropping funnel, temperature controller and maintained under a nitrogen atmosphere. The 6-Amide Diamine (259.0 g, 0.100 mol) is placed in the dropping funnel and warmed with a heat lamp to reduce its viscosity. The reactor is heated to 60° C. and the 6-Amide Diamine is added dropwise over a 275 minute period. Carbon dioxide is evolved during the addition. After the addition is complete, the reactor is heated at 100° C. for 3 hours, then at 150° C. for 3 hours at a reduced pressure of 1 mm Hg to remove the toluene. The product (278.4 g) is obtained as a dark red viscous liquid: Brookfield viscosity, >2,000,000 cps (26° C.): 0.0442 meq/g by HCl titration, which corresponds to a 93.7 percent amine conversion: 0.645 meq/g by HClO$_4$ titration, which corresponds to 84.8 mol percent amine amide 100:0 molar ratio of amine amide:urea carboxylate by proton NMR analysis: carbon-13 NMR shows the amine amide carbonyl (168.7 ppm).

| Assay: | 86.3 wt % | Amine Amide |
|---|---|---|
| | 0 wt % | Urea Carboxylate |
| | 5.7 wt % | Starting Amine |
| | 92.0 wt % | Total |

EXAMPLE 16

Preparation of a Diamine Containing a Poly(propyleneoxy) Backbone and Six Amide Moieties Based on Adipic Acid and D-2000 and Containing o-Aminophenyl End Groups A diamine containing a poly(propyleneoxy) backbone and about six amide moieties per average molecule (6-Amide Diamine, MW=9289) was prepared from (1) Jeffamine ™ D-2000 (an aminated poly(propylene glycol) of about 2000 molecular weight manufactured by Texaco) and (2) adipic acid using the procedure described in U.S. Ser. No. 485,678, filed Feb. 27, 1990, by the same inventor (1.3:1 molar ratio of D-2000:adipic acid). Isatoic anhydride (6.54 g, 0.040 mol) is slurried with toluene (75 g) in the same reactor used in Experiment 1. The 6-Amide Diamine (185.8 g, 0.020 mol) is placed in the dropping funnel and warmed with a heat lamp to reduce its viscosity. The reactor is heated to 60° C. and the 6-Amide Diamine is added dropwise over a 330 minute period. Carbon dioxide is evolved during the addition. After the addition is complete, the reactor is heated at 100° C. for 3 hours, then at 150° C. for 3 hours at a reduced pressure of 1 mm Hg to remove the toluene. The product (192.0 g) is obtained as a dark red viscous liquid: Brookfield viscosity, 43,600 cps (26° C.): 0.0151 meq/g by HCl titration, which corresponds to a 92.5 percent amine conversion: 0.198 meq/g by HClO$_4$ titration, which corresponds to 91.5 mol percent amine amide: 100:0 molar ratio of amine amide:urea carboxylate by proton NMR analysis: carbon-13 NMR shows the amine amide carbonyl (168.7 ppm).

| Assay: | 87.1 wt % | Amine Amide |
|---|---|---|
| | 0 wt % | Urea Carboxylate |
| | 7.0 wt % | Starting Amine |
| | 94.1 wt % | Total |

EXAMPLE 17

Preparation of a Diamine Containing a Poly(propyleneoxy) Backbone and Five Urea Based on Urea and D-2000 and Containing o-Aminophenyl End Groups A diamine containing a poly(propyleneoxy) backbone and about five urea moieties per average molecule (5-Urea Diamine, MW=13,361) was prepared from Jeffamine ™ D-2000 and urea using the procedure described in U.S. Ser. No. 485,678, filed Feb. 27, 1990, by the same inventor (1.2:1 molar ratio of D-2000:urea). Isatoic anhydride (6.54 g, 0.040 mol) is slurried with toluene (75 g) in the same reactor used in Experiment 1. The 5-Urea Diamine (185.8 g, 0.020 mol) is placed in the dropping funnel and warmed with a heat lamp to reduce its viscosity. The reactor is heated to 60° C. and the 5-Urea Diamine is added dropwise over a 8 hour period. Carbon dioxide is evolved during the addition. After the addition is complete, the reactor is heated at 100° C. for 3 hours, then at 150° C. for 3 hours at a reduced pressure of 1 mm Hg to remove the toluene. The product (271.0 g) is obtained as a dark red viscous liquid: Brookfield viscosity, 46,250 cps (26° C.); 0.0230 meq/g by HCl titration, which corresponds to a 84.5 percent amine conversion: 0.142 meq/g by HClO$_4$ titration, which corresponds to 80.6 mol percent amine amide; 100:0 molar ratio of amine amide:urea carboxylate by proton NMR analysis; carbon-13 NMR shows the amine amide carbonyl (168.7 ppm).

| Assay: | 80.9 wt % | Amine Amide |
|---|---|---|
| | 0 wt % | Urea Carboxylate |
| | 15.4 wt % | Starting Amine |
| | 96.3 wt % | Total |

EXAMPLE 18

Preparation of a Diamine Containing a Poly(propyleneoxy) Backbone and Four Biuret Moieties Based on Biuret and D-400 and Containing o-Aminophenyl End Groups A diamine containing a poly(propyleneoxy) backbone and about four biuret moieties per average molecule (4-Biuret Diamine, MW=2065) was prepared from Jeffamine ™ D-400 and biuret using the procedure described in U.S. Ser. No. 485,678, filed Feb. 27, 1990, by the same inventor (1.33 1 molar ratio of D-400:biuret). Isatoic anhydride (32.60 g, 0.200 mol) is slurried with toluene (75 g) in the same reactor used in Experiment 1. The 4-Biuret Diamine (206.6 g, 0.100 mol) is placed in the dropping funnel and warmed with a heat lamp to reduce its viscosity. The reactor is heated to 60° C. and the 4-Biuret Diamine is added dropwise over a 210 minute period. Carbon dioxide is evolved during the addition. After the addition is complete, the reactor is heated at 100° C. for 3 hours, then at 150° C. for 3 hours at a reduced pressure of 1 mm Hg to remove the toluene. The product (229.7 g) is obtained as a dark red viscous liquid: Brookfield viscosity, >2,000,000 cps (26° C.): 0.0472 meq/g by HCl titration, which corresponds to a 94.6 amine conversion: 0.833 meq/g by HClO$_4$ titration, which corresponds to 90.3 mol percent amine amide: 100:0 molar ratio of amine amide:urea carboxylate by proton NMR analysis: carbon-13 NMR shows the amine amide carbonyl (168.7 ppm).

| Assay: | 90.5 wt % | Amine Amide |
|---|---|---|
| | 0 wt % | Urea Carboxylate |
| | 4.9 wt % | Starting Amine |
| | 95.4 wt % | Total |

EXAMPLE 19

Preparation of a Diamine Containing a Poly(propyleneoxy) Backbone and Three Urea Based on Urea and D-400 and Containing o-Aminophenyl End Groups A diamine containing a poly(propyleneoxy) backbone and about three urea moieties per average molecule (3-Urea Diamine, MW=1785) was prepared from Jeffamine ™ D-400 and urea using the procedure described in U.S. Ser. No. 485,678, filed Feb. 27, 1990 same inventor (1.35:1 molar ratio of D-400:urea). Isatoic anhydride (32.60 g, 0.200 mol) is slurried with toluene (75 g) in the same reactor used in Experiment 1. The 3-Urea Diamine (178.5 g, 0.100 mol) is placed in the dropping funnel and warmed with a heat lamp to reduce its viscosity. The reactor is heated to 60° C. and the 3-Urea Diamine is added dropwise over a 147 minute period. Carbon dioxide is evolved during the addition. After the addition is complete, the reactor is heated at 100° C. for 3 hours, then at 150° C. for 3 hours at a reduced pressure of 1 mm Hg to remove the toluene. The product (200.7 g) is obtained as a dark red viscous liquid: Brookfield viscosity, 546,000 cps (26° C.): 0.210 meq/g by HCl titration, which corresponds to a 78.9 percent amine conversion: 1.010 meq/g by HClO$_4$ titration, which corresponds to 80.3 mol percent amine amide 100:0 molar ratio of amine amide:urea carboxylate by proton NMR analysis: carbon-13 NMR shows the amine amide carbonyl (168.7 ppm).

| Assay: | 81.0 wt % | Amine Amide |
|---|---|---|
| | 0 wt % | Urea Carboxylate |
| | 18.7 wt % | Starting Amine |
| | 99.7 wt % | Total |

EXAMPLE 20

Preparation of a Diamine Containing a Poly(propyleneoxy) Backbone and Three Urea Thiourea Moieties Based on Thiourea and D-400 and Containing o-Aminophenyl End Groups A diamine containing a poly(propyleneoxy) backbone and about three urea moieties per average molecule (3-Thiourea Diamine, MW=2149) was prepared from Jeffamine ™ D-400 and thiourea using the procedure described in U.S. Ser. No. 485,678, filed Feb. 27, 1990 by the same inventor (1.2:1 molar ratio of D-400:thiourea). Isatoic anhydride (32.60 g, 0.200 mol) is slurried with toluene (75 g) in the same reactor used in Experiment 1. The 3-Thiourea Diamine (214.9 g, 0.100 mol) is placed in the dropping funnel and warmed with a heat lamp to reduce its viscosity. The reactor is heated to 60° C. and the 3-Thiourea Diamine is added dropwise over a 127 minute period. Carbon dioxide is evolved during the addition. After the addition is complete, the reactor is heated at 100° C. for 3 hours, then at 150° C. for 3 hours at a reduced pressure of 1 mm Hg to remove the toluene. The product (236.6 g) is obtained as a dark red viscous liquid: Brookfield viscosity, 571,000 cps (26° C.): 0.319 meq/g by HCl titration, 0.972 meq/g (to titrate thiourea moieties) by HClO$_4$ titration, 100.0 mol ratio of amine amine:urea carboxylate by proton NMR analysis: carbon-13 NMR shows the amine amide carbonyl (168.7 ppm). The number of thiourea moieties/molecule has been reduced from 3.04 to 256 during reaction.

| Assay: | 66.9 wt % | Amine Amide |
|---|---|---|
| | 0 wt % | Urea Carboxylate |
| | 28.9 wt % | Starting Amine |
| | 95.8 wt % | Total |

EXAMPLE 21

Preparation of a Diamine Containing a Poly(propyleneoxy) Backbone. Two Thiourea Moieties Based on Thiourea, and Two Amide Moieties Based on Adipic Acid and D-400 and Containing o-Aminophenyl End Groups A diamine containing a poly(propyleneoxy) backbone and about two thiourea moieties and about two amide moieties per average molecule (2-Thiourea/2-Amide Diamine, MW=2036) was prepared stepwise from Jeffamine ™ D-400, thiourea and adipic acid using the procedure described in U.S. Ser. No. 485,678, filed Feb. 27, 199, by the same inventor (2:1 molar ratio of D-400:thiourea: followed by a 2:1 ratio of the resultant product:adipic acid) Isatoic anhydride (32.60 g, 0.200 mol) is slurried with toluene (75 g) in the same reactor used in Experiment 1. The 2-Thiourea/2-Amide Diamine (203.7 g, 0.100 mol) is placed in the dropping funnel and warmed with a heat lamp to reduce its viscosity. The reactor is heated to 60° C. and the 2-Thiourea/2-Amide Diamine is added dropwise over a 126 minute period. Carbon dioxide is evolved during the addition. After the addition is complete, the reactor is heated at 100° C. for 3 hours, then at 150° C. for 3 hours at a reduced pressure of 1 mm Hg to remove the toluene. The product (222.5 g) is obtained as a dark red viscous liquid: Brookfield viscosity, 1,396,000 cps (26° C.): 0.0712 meq/g by HCl titration, which corresponds to a 92.1 percent amine conversion; 0.888 meq/g by HClO$_4$ titration, which corresponds to 90.9 mol percent amine amide; 100:0 molar ratio of amine amide:urea carboxylate by proton NMR analysis; carbon-13 NMR shows the amine amide carbonyl (168.7 ppm).

| Assay: | 93.0 wt % | Amine Amide |
|---|---|---|
| | 0 wt % | Urea Carboxylate |
| | 7.2 wt % | Starting Amine |
| | 100.2 wt % | Total |

What is claimed is:

1. A process for the preparation of an o-aminophenyl derivative of a polyalkyleneoxy polyamine which comprises adding a polyalkyleneoxy polyamine to a dispersion or solution of an isatoic anhydride under reaction conditions sufficient to form the corresponding o-aminophenyl derivative.

2. The process of claim 1 wherein the average amine functionality of the polyalkyleneoxy polyamine is at least about 2.0.

3. The process of claim 1 wherein the average amine functionality of the polyalkyleneoxy polyamine is no greater than about 3.0.

4. The process of claim 1 wherein the reaction is carried out in a fluid comprising toluene, acetone, or methylethylketone.

5. The process of claim 4 wherein the fluid comprises toluene.

6. The process of claim 1 wherein the reaction is carried out in a fluid comprising an o-aminophenyl derivative of a polyalkyleneoxy polyamine.

7. The process of claim 1 wherein the reaction is carried out in a solvent or inert fluid, wherein the weight percent of the isatoic anhydride to solvent or inert fluid is at least about 10 percent.

8. The process of claim 1 wherein the reaction is carried out in a solvent or inert fluid, wherein the weight percent of the isatoic anhydride to solvent or inert fluid is no greater than about 25 percent.

9. The process of claim 1 wherein the equivalent ratio of isatoic anhydride:polyalkyleneoxy polyamine is at least about 0.9 1.

10. The process of claim 1 wherein the equivalent ratio of isatoic anhydride:polyalkyleneoxy polyamine is no greater than about 2:1.

11. The process of claim 1 wherein the selectivity to the o-aminophenyl derivative is at least about 90 percent.

12. The process of claim 11 wherein the selectivity to the o-aminophenyl derivative is at least about 95 percent.

13. The process of claim 11 wherein the selectivity to the o-aminophenyl derivative is at least about 98 percent.

14. The process of claim 1 which is carried out at a temperature of at least about 35° C.

15. The process of claim 1 which is carried out at a temperature of no greater than about 100° C.

16. A process for the preparation of an o-aminophenyl derivative of a polyalkyleneoxy polyamine which comprises adding a polyalkyleneoxy polyamine to a dispersion or solution of an isatoic anhydride under reaction conditions sufficient to form the corresponding o-aminophenyl derivative, wherein such reaction conditions are also sufficient to minimize the formation of a corresponding urea carboxylate.

17. An o-aminophenyl derivative of a modified polyamine comprising a backbone portion containing at least one polyalkyleneoxy moiety and one or more internal urea, biuret, amide, thiourea, dithiobiuret, or thioamide moieties, and a plurality of o-aminophenyl end groups wherein each amino group is separated from each urea, biuret, amide, thiourea, dithiobiuret, or thioamide moiety by at least one alkylene, cycloalkylene, aralkylene, arylene, or alkyleneoxy moiety with 4–20 carbon atoms, or at least one polyalkyleneoxy moiety containing from 2–50 alkyleneoxy units.

18. The o-aminophenyl derivative of claim 17 which contains urea moieties.

19. The o-aminophenyl derivative of claim 17 which contains amide moieties.

20. A prepolymer or polymer comprising the reaction product of the o-aminophenyl derivative of claim 17 and at least one polyisocyanate.

21. The o-aminophenyl derivative of claim 17 which contains biuret moieties.

22. The o-aminophenyl derivative of claim 17 which is a diamine.

23. The o-aminophenyl derivative of claim 17 which is a triamine.

24. An isocyanate-functional polymer comprising the reaction product of
   a) the o-aminophenyl derivative of claim 17 and
   b) an excess over stoichiometry of an organic polyisocyanate.

25. An isocyanate-functional prepolymer comprising the reaction product of
   a) the o-aminophenyl derivative of claim 22 and
   b) an excess over stoichiometry of an organic polyisocyanate.

26. An isocyanate-functional prepolymer comprising the reaction product of
   a) the o-aminophenyl derivative of claim 23 and
   b) an excess over stoichiometry of an organic polyisocyanate.

27. A polymer which is the reaction product of at least one active hydrogen-containing compound and the prepolymer of claim 24.

28. A polymer comprising the reaction product of
   a) the o-aminophenyl derivative of claim 17 and
   b) at least one organic polyisocyanate.

29. A polymer of claim 28 which contains urea and/or amide moieties.

30. A polymer comprising the reaction product of
   a) the o-aminophenyl derivative of claim 22 and
   b) at least one organic polyisocyanate.

31. A polymer comprising the reaction product o-aminophenyl derivative of
   a) the o-aminophenyl derivative of claim 23 and
   b) at least one organic polyisocyanate.

32. A polymer comprising the reaction product of
   a) the o-aminophenyl derivative of claim 17,
   b) at least one organic polyisocyanate, and
   c) at least one other active hydrogen-containing compound.

33. A polymer comprising the reaction product of approximately equivalent amounts of
   a) the o-aminophenyl derivative of claim 22,
   b) at least one organic polyisocyanate, and
   c) at least one other active hydrogen-containing compound.

34. A polymer comprising the reaction product of approximately equivalent amounts of
   a) the o-aminophenyl derivative of claim 23,
   b) at least one organic polyisocyanate, and
   c) at least one other active hydrogen-containing compound.

* * * * *